United States Patent [19]
Todd et al.

[11] Patent Number: 5,618,005
[45] Date of Patent: Apr. 8, 1997

[54] COAXIAL REEL TAPE CARTRIDGE WITH REDUCED TAPE FORCES

[75] Inventors: Christian A. Todd, Thornton; Donovan M. Janssen, Boulder; Lynn C. Jacobs, Berthoud; James W. Wolf, Loveland, all of Colo.

[73] Assignee: Storage Technology Corporation, Louisville, Colo.

[21] Appl. No.: 527,651

[22] Filed: Sep. 13, 1995

[51] Int. Cl.⁶ .................................................. G11B 23/087
[52] U.S. Cl. .................................... 242/345.1; 242/346
[58] Field of Search ........................... 242/342, 343, 242/343.1, 343.2, 345.1, 346, 344, 347, 347.1; 360/132

[56] References Cited

U.S. PATENT DOCUMENTS

| | | | |
|---|---|---|---|
| 3,250,481 | 5/1966 | Seki | 242/345.1 |
| 3,263,936 | 8/1966 | Williams | 242/345.1 |
| 3,672,603 | 6/1972 | Swain | 242/345.1 |
| 3,677,494 | 7/1972 | Protas | 242/345.1 |
| 3,684,208 | 8/1972 | Larsen . | |
| 3,690,590 | 9/1972 | Bennett et al. | 242/345.1 |
| 3,716,205 | 2/1973 | Geuder . | |
| 3,819,130 | 6/1974 | Moxness . | |
| 3,920,198 | 11/1975 | Sutliff | 352/72 |
| 3,936,010 | 2/1976 | Lu | 242/346 |
| 3,968,941 | 7/1976 | Catto . | |
| 4,012,793 | 3/1977 | Blanding | 242/345.1 |
| 4,015,293 | 3/1977 | Blanding | 360/130 |
| 4,131,925 | 12/1978 | Firth et al. | 360/130 |
| 4,592,522 | 6/1986 | Grant . | |
| 4,858,848 | 8/1989 | Katoku et al. | 242/344 |
| 5,239,437 | 8/1993 | Hoge et al. | 242/344 |
| 5,253,136 | 10/1993 | Suzuki et al. | 360/132 |
| 5,253,822 | 10/1993 | Matsuki et al. | 242/347 |
| 5,269,412 | 12/1993 | Doodson | 242/344 |
| 5,351,159 | 9/1994 | Dodt et al. | 360/132 |
| 5,358,193 | 10/1994 | Madsen et al. | 242/342 |
| 5,367,421 | 11/1994 | Shiba et al. | 242/347.1 |
| 5,371,644 | 12/1994 | Hoge et al. | 360/132 |
| 5,377,927 | 1/1995 | Erickson et al. | 242/346 |
| 5,513,815 | 5/1996 | Erickson et al. | 242/346 |
| 5,519,562 | 5/1996 | Argumendo et al. | 242/346 |

FOREIGN PATENT DOCUMENTS

| | | | |
|---|---|---|---|
| 2559763 | 11/1977 | Germany | 242/344 |
| 52-40109 | 3/1977 | Japan | 360/132 |
| 3-189978 | 8/1991 | Japan | 360/132 |
| 2257115 | 1/1993 | United Kingdom | 360/132 |

Primary Examiner—John P. Darling
Attorney, Agent, or Firm—Duft, Graziano & Forest, P.C.

[57] ABSTRACT

The coaxial reel tape cartridge uses a lengthy tape path within the tape cartridge to reduce the stresses on the tape medium as it is transported between the two reels. The tape is drawn from each reel around a corresponding rotating guide element which is coplanar with the tape reel. The tape is then transported along one side of the tape cartridge exterior housing to a corresponding hydrostatic bearing which is located at a corner of the tape cartridge adjacent the tape access opening. The hydrostatic bearing is coplanar with the tape guide, but at a slight angle with the vertical to thereby impart a slight twist to the tape as it traverses the length of the tape cartridge. The two hydrostatic bearings are located inside of and at opposite ends of the tape cartridge exterior housing, flanking the tape access opening. The two hydrostatic bearings are attached to a base plate which maintains the hydrostatic bearings coplanar with respect to each other. The base plate itself is angled with respect to the horizontal plane of the tape cartridge exterior housing so that the tape, as it traverses the path between the two hydrostatic bearings, changes elevation from the plane of the first reel to the plane of the second reel. The tape is only subjected to a twist along one segment of the tape path while remaining coplanar along this segment of the tape path, and is subjected to an elevation change in a manner that involves neither twist nor bending.

22 Claims, 14 Drawing Sheets

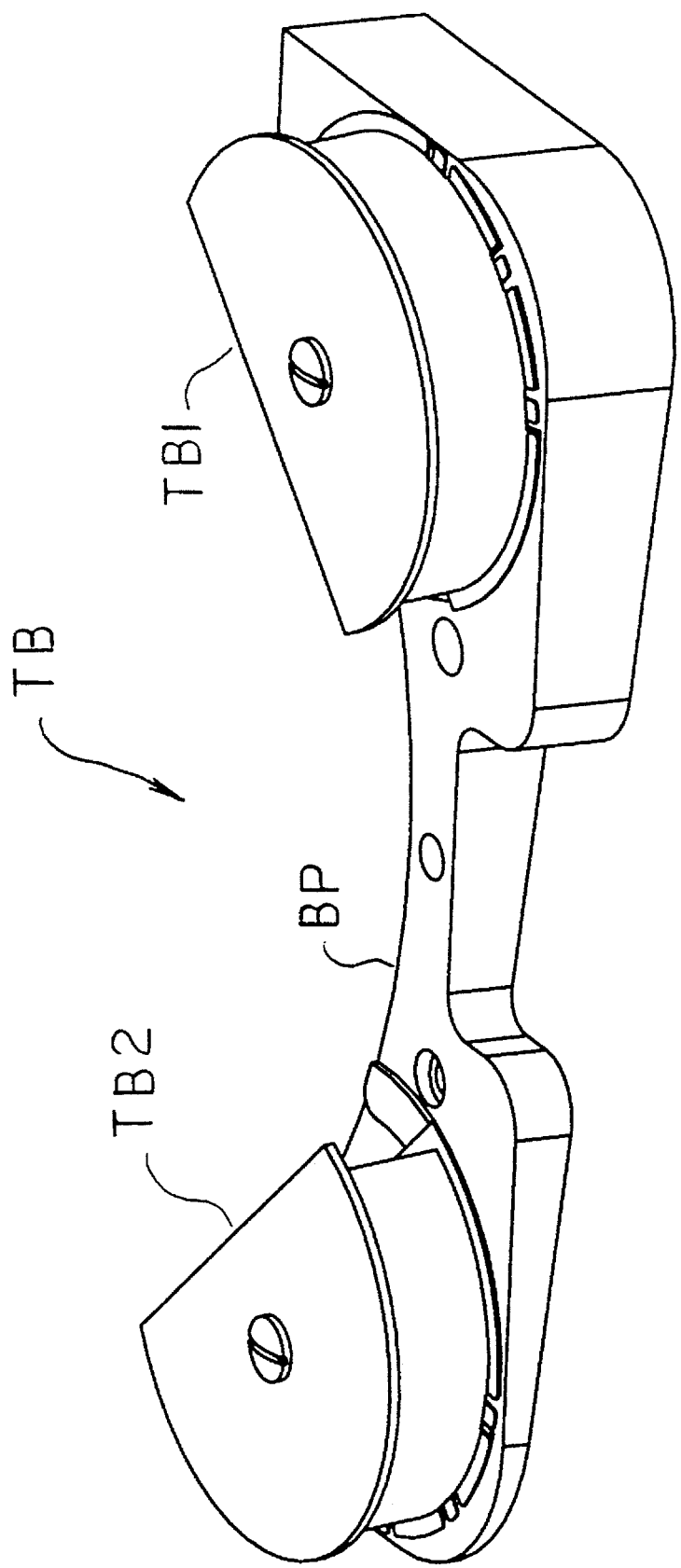

COAXIAL REEL TAPE CARTRIDGE WITH REDUCED TAPE FORCES

FIELD OF THE INVENTION

This invention relates to data storage systems comprising a data storage cartridge and its associated cartridge drive and, in particular, to a coaxial reel tape cartridge that substantially corresponds in exterior dimensions to the standard 3480-type form factor and which is implemented to minimize the twist and stretch on the tape that is loaded therein as the two reels are independently driven by the corresponding drive motors of the cartridge drive.

PROBLEM

It is a problem in the field of data storage systems to maximize data storage capacity on the data storage media, while also minimizing the data access time while also avoiding the introduction of new data storage media formats. A commonly used data storage media is magnetic tape due to its data storage capacity, ease of writing/reading data, longevity, ease of handling, resistance to damage and data loss and large embedded base of magnetic tape products. In the magnetic tape data storage media technology, a commonly used data storage element is the 3480-type magnetic tape cartridge. The 3480-type magnetic tape cartridge comprises a housing of predefined exterior dimensions which encloses a single rotatable reel on which is wound a length of magnetic tape of predefined dimensions. One end of this magnetic tape is connected to a leader block, which is accessible to a tape drive via an opening in one corner of the 3480-type magnetic tape cartridge. When the 3480-type magnetic tape cartridge is mounted in a tape drive, the tape threading arm of the tape drive grasps the leader block and threads the leader block, with its attached magnetic tape, through a complex tape threading path to the take up reel, which is permanently mounted in the tape drive. Once the leader block is seated in the take up reel, the tape drive can wind the magnetic tape between the cartridge reel and the take up reel to read and write data on the magnetic tape.

There are a number of difficulties with the existing 3480-type magnetic tape cartridge technology. A significant problem is the need for a leader block to enable the tape drive to thread the magnetic tape from the 3480-type magnetic tape cartridge to the tape drive take up reel. The tape threading path is complex and the tape threading arm is used only once during the magnetic tape cartridge mount and dismount process. The resultant tape drive mechanism is therefore costly and suffers from reliability due to its complexity. The magnetic tape is also sequential in nature and the single reel of the 3480-type magnetic tape cartridge necessitates that all tape operations begin at the leader block end of the magnetic tape. The addition of data to the magnetic tape necessitates spooling the magnetic tape to the physical end of the last written data record, while reading a selected data record necessitates searching the length of magnetic tape to locate the identified data record. The longer the length of magnetic tape provided in the 3480-type magnetic tape cartridge, the greater these tape positioning times. Also, dismounting the magnetic tape cartridge requires that the entirety of the magnetic tape be rewound on to the tape cartridge reel before the magnetic tape cartridge can be removed from the tape drive. While each of these factors may represent only a small cost to the user, their cumulative effect can be significant.

Existing magnetic tape data storage systems are inflexible and the difficulty of transition from one type of data storage media to another is exacerbated by the use of large automated cartridge library systems. Storage Technology Corporation manufactures and sells a line of cartridge library systems, each of which provides efficient handling of large quantities of the industry-standard 3480-type magnetic tape cartridges for an associated plurality of tape drives. The robotic media handling elements in an automated cartridge library system typically cannot handle diverse types of media and are typically limited to a single form factor data storage element. It is therefore difficult to displace the 3480-type magnetic tape cartridge form factor due to the large embedded base of automated cartridge library systems presently in operation and the extensive customer use of volume management systems that are used to manage 3480-type form factor magnetic tape cartridges.

Thus, users have a vested interest in resisting displacement of the single reel 3480-type magnetic tape cartridge as the data storage medium of choice. Small design changes in the 3480-type magnetic tape drives are palatable to the users since the users can incrementally upgrade their tape drives and a growing population of upgraded 3480-type magnetic tape cartridges. However, any change in the underlying 3480-type magnetic tape cartridge form factor which would impact availability of the automated cartridge library systems represents a significant problem. Thus, dual reel magnetic tape cassettes are presently not a major design consideration in the mainframe data storage industry since they are not compatible in form factor with the existing 3480-type magnetic tape cartridges and the embedded base of automated cartridge library systems. The dual reel magnetic tape cassettes have a number of inherent advantages, such as not requiring the use of a leader block or a complex external tape threading path. The dual reel magnetic tape cassettes also enable a user to dismount a tape cassette as soon as the presently executing operation is completed, since the magnetic tape need not be rewound on to the source reel for the tape drive to be physically able to dismount the magnetic tape cassette. If the magnetic tape in the dual reel magnetic tape cassette is repositioned to the mid-tape location before dismount, it on average takes less than one half the time as an identical length of single reel tape to position the magnetic tape for read/write operations, since the initial position is at mid tape rather than physical end of tape. All of these advantages of dual reel magnetic tape cassettes are however presently unavailable to the 3480-type magnetic tape cartridge environment due to the fact that dual reel data storage elements are physically incompatible with the existing 3480-type magnetic tape cartridge handling systems.

SOLUTION

The above problems are solved and a technical advance achieved in the field by the coaxial reel tape cartridge of the present invention. This tape cartridge, as illustrated by the preferred embodiment disclosed herein, makes use of a 3480-type magnetic tape cartridge housing form factor which encloses two coaxially mounted tape reels. The tape wound on these two reels is, in the preferred embodiment, an 8 mm width magnetic tape (as compared to a ½" magnetic tape for the 3480-type magnetic tape cartridge) accessible to the tape drive through an access opening formed in one end of the tape cartridge housing. The coaxially mounted tape reels are independently driven by two mating drive hubs in the tape drive to transport the tape between the two reels within the tape cartridge. The tape path within the tape cartridge is selected to minimize the forces on the tape contained therein. In particular, prior art coaxially mounted tape reels forced the tape through a tape path that stressed the tape due to the need to move the tape from a first elevation within the cartridge which corresponds to the center of the first reel to a second elevation within the cartridge which corresponds to the center of the second reel. In existing dual reel tape cartridges, traversing this change in elevation within the tape cartridge required twisting and redirecting the tape in a manner that caused tape stretch, significant torque forces on both the tape and the guide elements, which resulted in tape wear and premature failure.

The coaxial reel tape cartridge of the present invention makes use of a lengthy tape path within the tape cartridge and large radius tape guide surfaces to reduce the stresses on the tape medium as it is transported between the two reels. In particular, the preferred embodiment of the invention discloses apparatus wherein the tape is drawn from each reel around a corresponding guide element which is coplanar with the tape reel. The tape is then transported along one side of the interior of the tape cartridge housing to a corresponding hydrostatic bearing which is located at a corner of the tape cartridge which is adjacent the tape access opening. The hydrostatic bearing is coplanar with the tape guide, but at a slight angle to the vertical to thereby impart a slight twist to the tape as it traverses the length of the tape cartridge from the tape guide to its corresponding hydrostatic bearing. The two hydrostatic bearings are located inside of and at opposite ends of the tape cartridge housing, flanking the tape access opening. The two hydrostatic bearings are attached to a base plate which maintains the hydrostatic bearings coplanar with respect to each other. The base plate itself is angled with respect to the horizontal plane of the tape cartridge housing so that the tape, as it traverses the path between the two hydrostatic bearings, changes elevation from the plane of the first reel to the plane of the second reel without twist or stretch. In this manner, the forces on the tape are minimized as it traverses the length of the tape path from reel to reel. The angle of the base plate with respect to the housing is typically identical to the twist angle of the tape as it travels from a tape guide to its corresponding hydrostatic bearing. Thus, the tape is subjected to only a twist along one segment of the tape path while remaining coplanar along this segment of the tape path, and is subjected to an elevation change in a manner that involves neither twist nor bending nor stretching of the tape medium.

Additional features of the tape cartridge illustrated in the preferred embodiment of the present invention include the use of optional coding apertures to define the contents of the tape cartridge, the ability to drive the tape reels by simply magnetically coupling the tape reels to the tape drive hubs, a lock mechanism which concurrently locks reel to reel as well as reel to housing, compliant guides integral to the hydrostatic bearings, internal tape supports, and an architecture where all guide surfaces impact only the back side of the tape, not the recording surface.

BRIEF DESCRIPTION OF THE DRAWING

FIG. 5 illustrates a perspective view of the assembled hydrostatic bearing assembly of the tape cartridge of the present invention;

DETAILED DESCRIPTION

Figure 1:
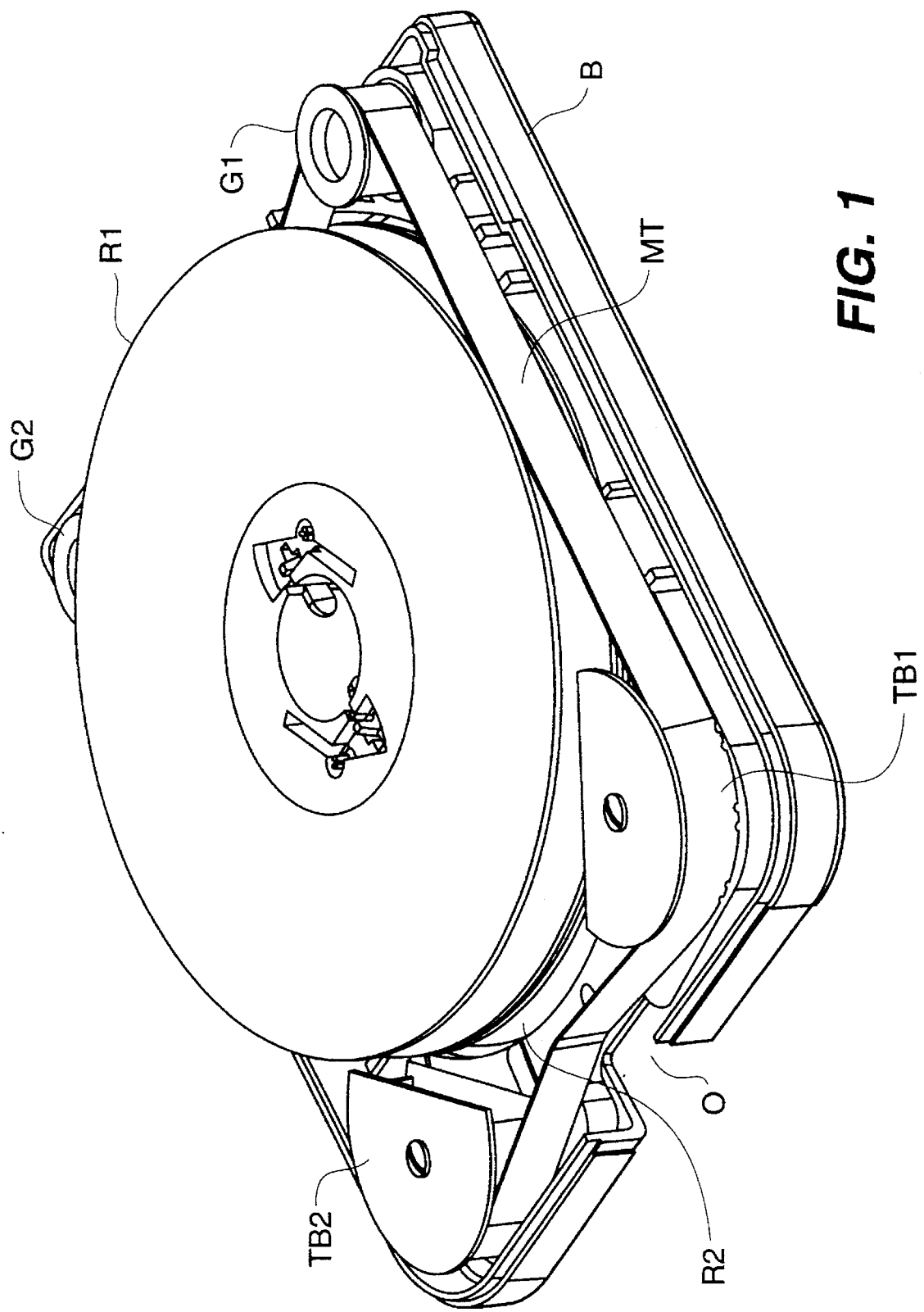
FIG. 1 illustrates a perspective view of the tape cartridge of the present invention with its cover removed.

This invention relates to data storage systems comprising a data storage cartridge and its associated cartridge drive and, in particular, to a coaxial reel tape cartridge which is implemented to minimize the twist and stretch on the tape medium that is loaded therein as the two reels of the tape cartridge are independently driven by the corresponding drive motors of the tape drive. This architecture of both tape cartridge and associated tape drive enables the storage of a significant amount of tape medium in the tape cartridge while also providing media management benefits heretofore unavailable in the data storage industry. The terminology used herein represents a unique and arbitrary perspective in that dual reel data storage elements are typically termed "cassettes" while single reel data storage elements are typically termed "cartridges" in the data storage industry. The tape cartridge disclosed in the preferred embodiment of the invention has the external dimensions that are substantially the same as the 3480-type magnetic tape cartridge, yet encloses two coaxially mounted tape reels. For the purpose of consistency in the description, the tape cartridge of the preferred embodiment of the present invention is arbitrarily termed "tape cartridge," although it could equally be termed a "cassette" as are other dual reel data storage elements.

The preferred embodiment of the present invention disclosed herein (FIGS. 1–3 and 22, 23) is tape cartridge TC that substantially corresponds in exterior dimensions to the industry standard 3480-type form factor magnetic tape cartridge. This tape cartridge TC makes use of a substantially 3480-type dimensioned exterior housing H which encloses two coaxially mounted and independently operable tape reels R1, R2. The tape MT wound on these two tape reels R1, R2 comprises a magnetic tape which is accessible to the tape drive through an access opening O formed in one end of the tape cartridge housing H, although other forms of tape data storage media can be used. The coaxially mounted tape reels R1, R2 are independently driven by two mating drive hubs DH1, DH2 in the tape drive (FIG. 16) to transport the magnetic tape MT between the two reels R1, R2 within the tape cartridge TC. The path that the magnetic tape MT traverses within the tape cartridge TC is selected to minimize the forces on the magnetic tape MT as it is transported between the two tape reels R1, R2. In particular, prior art coaxially mounted tape reels forced the magnetic tape through a tape path that stressed the magnetic tape due to the need to move the magnetic tape from a first elevation within the tape cartridge TC which corresponds to the center of the first tape reel R1 to a second elevation within the tape cartridge TC which corresponds to the center of the second tape reel R2. Traversing this distance required twisting and redirecting the magnetic tape in a manner that caused tape stretch, significant torque forces on both the magnetic tape and the guide elements, resulting in tape wear and premature failure. Some prior art coaxially mounted tape reel systems used tape guides which wound the magnetic tape "barber pole" fashion around the guide to achieve the elevation change. Such apparatus provided significant friction forces which had to be overcome by the drive motors of the tape drive and included tape steering problems as the tape moved a significant distance along the length of the tape guide in response to small deflections of the tape as it traversed the tape path up to the tape guide.

Tape Cartridge Architecture

Figure 22:
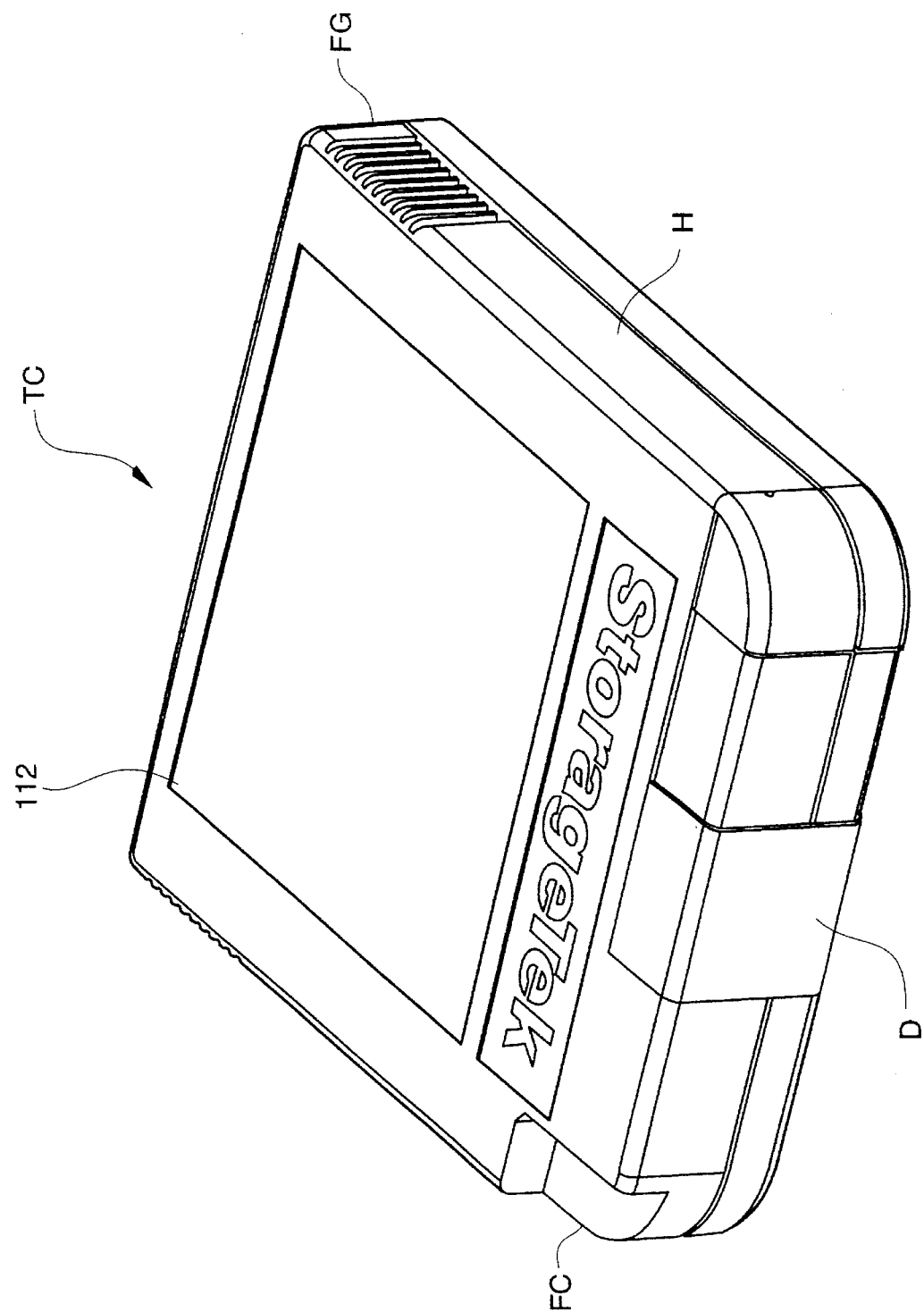
FIG. 22 illustrates a top-down perspective view of the tape cartridge of the present invention.
Figure 23:
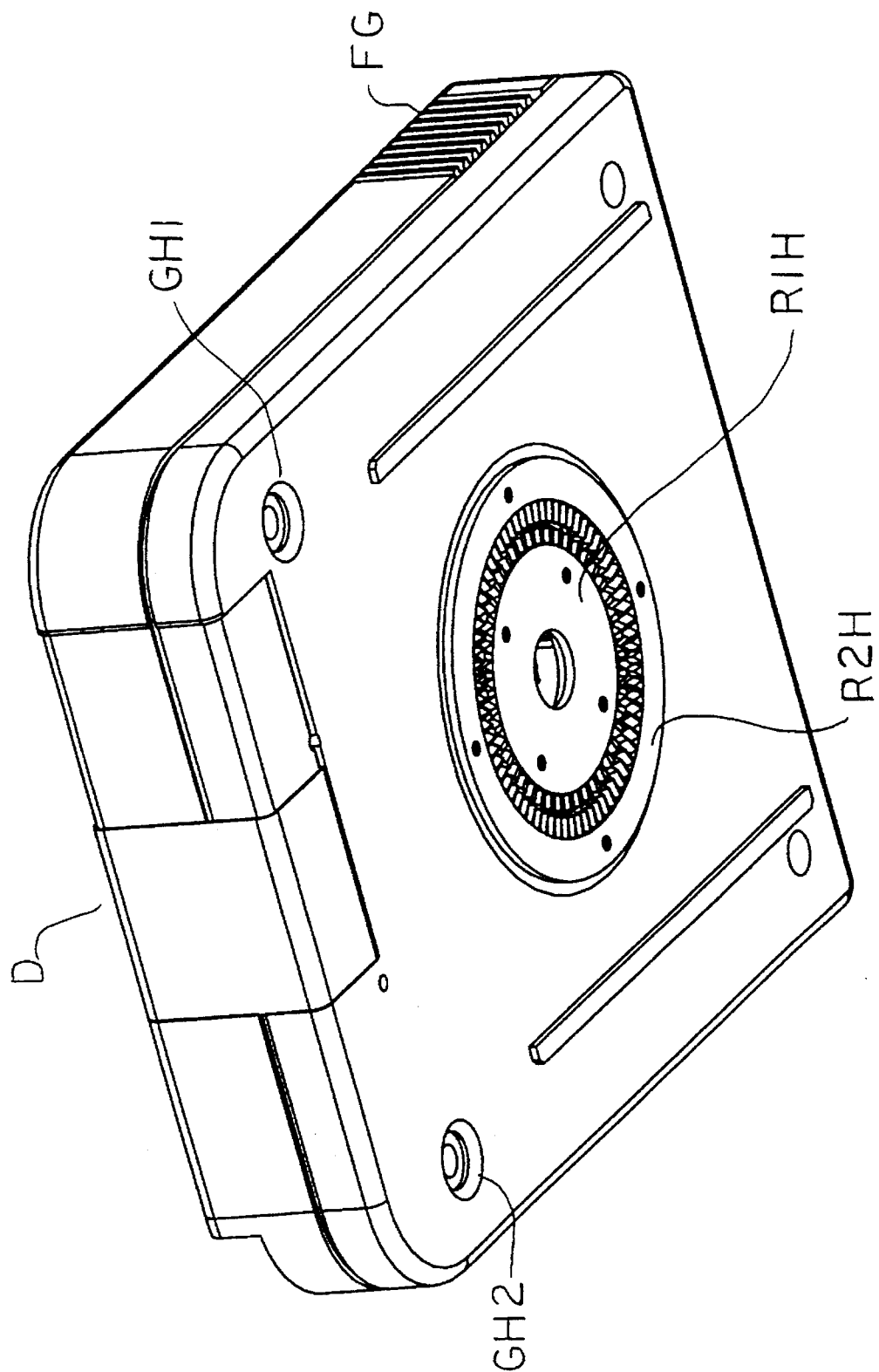
FIG. 23 illustrates a bottom-up perspective view of the tape cartridge of the present invention.

The exterior housing H of the tape cartridge TC comprises a substantially rectilinear element which is typically formed of two segments, comprising a cover segment C and a base segment B, which are joined together once the other apparatus illustrated herein are installed within the housing H. FIGS. 12–15 illustrate perspective, top down, end and side views of the assembled tape cartridge TC of the present invention, respectively. In addition, FIGS. 22 and 23 illustrate top-down perspective and bottom-up perspective views of the tape cartridge TC. As can be seen from these Figures, the exterior housing H can be equipped with finger grip areas FG to ensure simplified user handling of the tape cartridge TC for manual loading applications. In addition, a spring loaded door D is provided to cover the access opening O when the tape cartridge TC is not loaded on the tape drive. The width W, length L and depth DP dimensions of the tape cartridge TC are matters of design choice and have been selected to be substantially the same as those of the industry standard 3480-type magnetic tape cartridge. The typical 3480-type magnetic tape cartridge has exterior dimensions that are approximately 4¼" in width, 4⅞" in length and 1" in depth. The 3480-type magnetic tape cartridge by convention has a front side which includes an opening through which the tape drive accesses the tape medium contained therein. The 3480-type tape cartridge is inserted into the tape drive front side first.

The preferred embodiment of the coaxial reel tape cartridge TC of the present invention, as shown in FIG. 1, makes use of a simple and lengthy tape path within the tape cartridge TC to reduce the stresses on the magnetic tape medium MT as it is transported between the two tape reels R1, R2. In particular, the magnetic tape MT is drawn from each tape reel R1/R2 around a corresponding guide element G1/G2 which is coplanar with the tape reel R1/R2. The magnetic tape MT is then transported along one side of the interior of tape cartridge housing H to a corresponding hydrostatic (or hydrodynamic) bearing TB1/TB2 which is located at a corner of the tape cartridge housing H which is adjacent the tape access opening O. The hydrostatic bearing TB1/TB2 is coplanar with its associated tape guide G1/G2, but at a slight angle with the vertical to thereby impart a slight twist to the magnetic tape MT as it traverses the length of the tape cartridge TC from the tape guide G1/G2 to its corresponding hydrostatic bearing TB1/TB2. The two hydrostatic bearings TB1, TB2 are located inside of and at opposite ends of the tape cartridge housing H, flanking the tape access opening O. The two hydrostatic bearings TB1, TB2 are attached to a base plate BP which maintains the hydrostatic bearings TB1, TB2 coplanar with respect to each other. The base plate BP itself is angled with respect to the horizontal plane of the tape cartridge housing H so that the magnetic tape MT, as it traverses the path between the two hydrostatic bearings TB1–TB2, changes elevation from the plane of the first tape reel R1 to the plane of the second tape reel R2. In this manner, the forces on the magnetic tape MT are minimized as it traverses the length of the tape path from tape reel R1 to tape reel R2 with the guide forces being a function of the path length and the radium of the tape guide tape bearing surfaces. The angle of the base plate BP with respect to the housing H is typically identical to the twist angle of the magnetic tape MT as it travels from a tape guide G1/G2 to its corresponding hydrostatic bearing TB1/TB2. Thus, the magnetic tape MT is only subjected to a twist along one segment of the tape path while remaining coplanar along this segment of the tape path, and is subjected to an elevation change in a manner that involves neither twist nor bending.

The position of the access opening O on the front side of the exterior housing mechanically differentiates the coaxial reel tape cartridge TC of the present invention from the traditional 3480-type magnetic tape cartridge and enables a tape drive or a user to recognize the differences between these two cartridges. In order to further differentiate between these two types of cartridges, the right front corner FC (as viewed from above from the back of the cartridge to the front of the cartridge) of the front of the exterior housing H can also be angled or recesses in order to clearly distinguish this dual reel coaxial cartridge TC from conventional 3480-type magnetic tape cartridges.

Tape Cartridge Operational Elements

Figure 2:
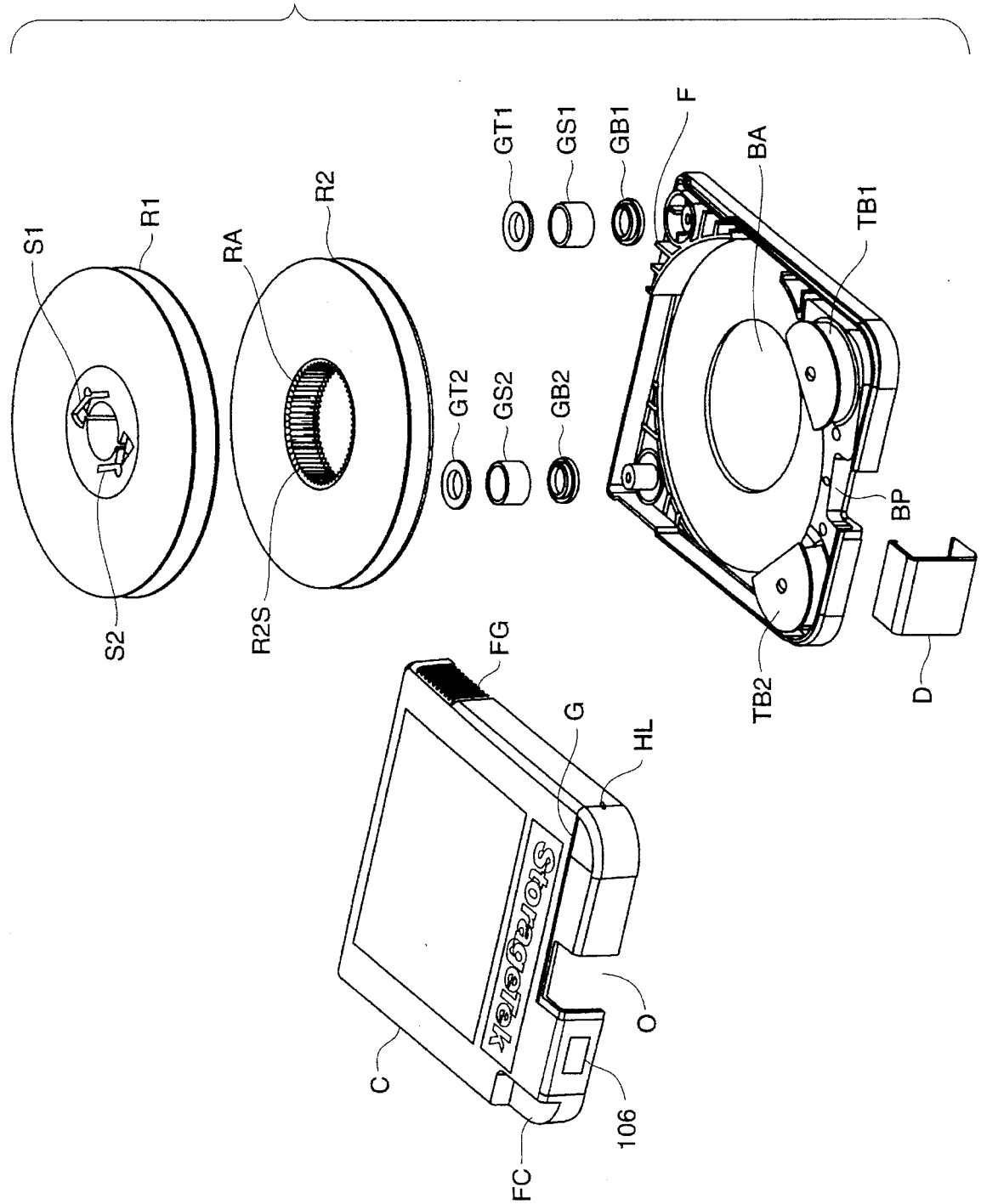
FIG. 2 illustrates an exploded top down perspective view of the tape cartridge of the present invention.
Figure 3:
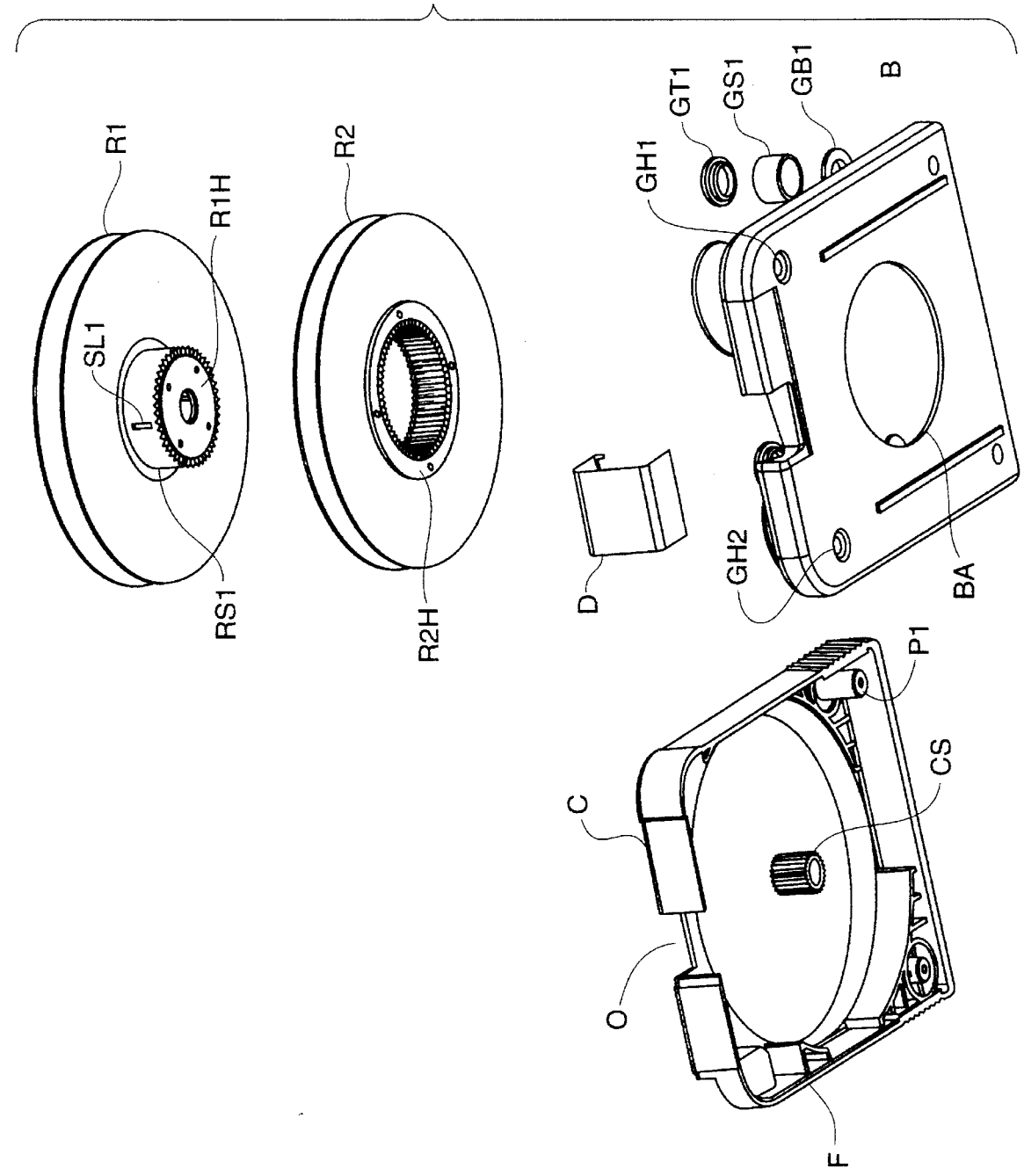
FIG. 3 illustrates an exploded bottom up perspective view of the tape cartridge of the present invention.

The various operational elements of the tape cartridge TC of the preferred embodiment of the invention are illustrated in FIGS. 2 and 3 which respectively illustrate an exploded top down perspective view of the tape cartridge TC and an exploded bottom up perspective view of the tape cartridge TC. The base section B of the exterior housing H includes an opening BA formed therein to accept the rim R2H which is integral to the second tape reel R2. This base section opening BA enables the first drive hub DH1 of the tape drive to engage the rim R1H located on the bottom of shaft RS1 of the first tape reel R1 and the second drive hub DH2 of the tape drive to engage the rim R2H of the second tape reel R2 to rotatably drive the respective tape reels R1, R2 independent of each other. The rim R2H of the second tape reel R2 includes a flat area which is magnetically coupled to the second drive hub DH2 and at least one gear tooth/hole (a plurality of gear teeth arranged circumferentially around the edge of rim R2H being shown) to enable the use of both a magnetic drive hub and a corresponding engagement tooth/pin(s) (a plurality of gear teeth arranged circumferentially around the edge of drive hub DH2 being shown) on the second drive hub DH2 of the tape drive to provide positive connection between the drive hub DH2 and the tape reel R2. The drive hubs DH1, DH2 of the tape drive of the preferred embodiment of the invention magnetically couple the drive hubs DH1, DH2 to the corresponding tape reels R1, R2 and the use of the teeth/pins on the second drive hub DH2 is to ensure precise coupling of the drive hub DH2 to the tape reel R2. Likewise the first drive hub DH1 of the tape drive includes a flat area which is magnetically coupled to rim R1H and at least one tooth (a plurality of gear teeth arranged circumferentially around the edge of drive hub DH1 being shown) which mates with corresponding one(s) of teeth (a plurality of gear teeth arranged circumferentially around the edge of rim R1H being shown) formed on the bottom of the shaft RS1 of the first tape reel R1. The shaft RS1 of the first tape reel R1 fits into the opening RA formed along the axis of rotation of the second tape reel R2 such that, when assembled, the shaft RS1 of the first tape reel R1 and the opening RA of the second tape reel R2 form a coaxial fit, with first tape reel R1 and second tape reel R2 freely rotating with respect to each other.

The tape cartridge TC can be assembled in a top-down manner without the necessity of complex assembly operations. This reduced labor and minimal parts count reduces the cost of the tape cartridge TC and the elemental structure used to implement tape cartridge TC improves reliability and possible repairability. The tape cartridge TC includes two hydrostatic tape guides G1, G2 which comprise top GT1, GT2 and bottom GB1, GB2 flanges which bound respective guide cylinders GS1, GS2. The guide flanges GT1, GT2, GB1, GB2 and cylinders GS1, GS2 are mounted on corresponding shafts P1, P2 formed on the two sections C, B of the exterior housing H. Also formed on the interior surface of the exterior housing sections C, B are tape guide ribs F which prevent the magnetic tape MT from dropping to an elevation within the tape cartridge TC which is not appropriate for this section of the magnetic tape MT should the preferred tape tension within the tape cartridge TC be lost. Thus, tape slack is maintained in position opposite the specifically selected position until the tape tension is restored.

The tape reels R1, R2 each comprise a spool on which the magnetic tape MT can be wound. The tape reel R1, R2 comprises a cylindrical shaped hub, on top of which and on bottom of which are mounted cylindrical plates. The top and bottom plates of the tape reel R1, R2 can be tapered in shape or oriented to form a tapered opening into which the magnetic tape MT is wound on the centrally located hub. The two tape reels R1, R2 rotate about a common axis and in parallel planes. In particular, the interior top and/or bottom surface of the exterior housing H comprises a plane and each of the two tape reels R1/R2 rotate about the common axis in a respective plane that is parallel to the plane of rotation of the other tape reel R2/R1 and parallel to or at least substantially parallel to the plane of an interior surface of the exterior housing H. The magnetic tape MT is wound on the tape reels R1, R2 such that the recording surface of the magnetic tape MT does not contact the tape guides G1, G2 or hydrostatic bearings TB1, TB2, to thereby reduce the wear on the magnetic tape MT.

The exterior housing H can include a plurality of cartridge registration holes GH1, GH2 so that the tape drive can insert corresponding guide pins (not shown) therein. The tape drive guide pins align the interior surfaces of the tape cartridge TC with the tape drive by aligning with a reference surface, such as the bottom of base plate BP, that is located internal to the tape cartridge TC. The guide pins and the drive hubs DH1, DH2 set the horizontal position as well as the elevation of the tape cartridge TC with respect to the tape drive. The precise positioning of the tape cartridge TC on the tape drive is typically complemented by the use of movable heads on the tape drive so that the tape drive can locate and track the selected ones of the plurality of tracks of data written on the magnetic tape MT. In addition, grooves G are provided in the exterior housing H to receive the slidable access door D and enable the access door D to be repositioned to expose the access opening O. The access door D is typically manufactured of sheet metal and is spring loaded, with the spring (not shown) being inserted into a hole HL located at the base of the groove G and secured therein by a pin or other means. The access door D can be of other configurations, such as hinged, but is shown as a slidable element in this embodiment. In addition, an optional write protect feature can be provided in the form of a removable tab located on the bottom of the exterior housing H to expose a hole formed in the tape cartridge exterior housing H. The write protect tab operates as in other write protect features commonly found in tape drives.

Hydrostatic Bearings

Figure 4:
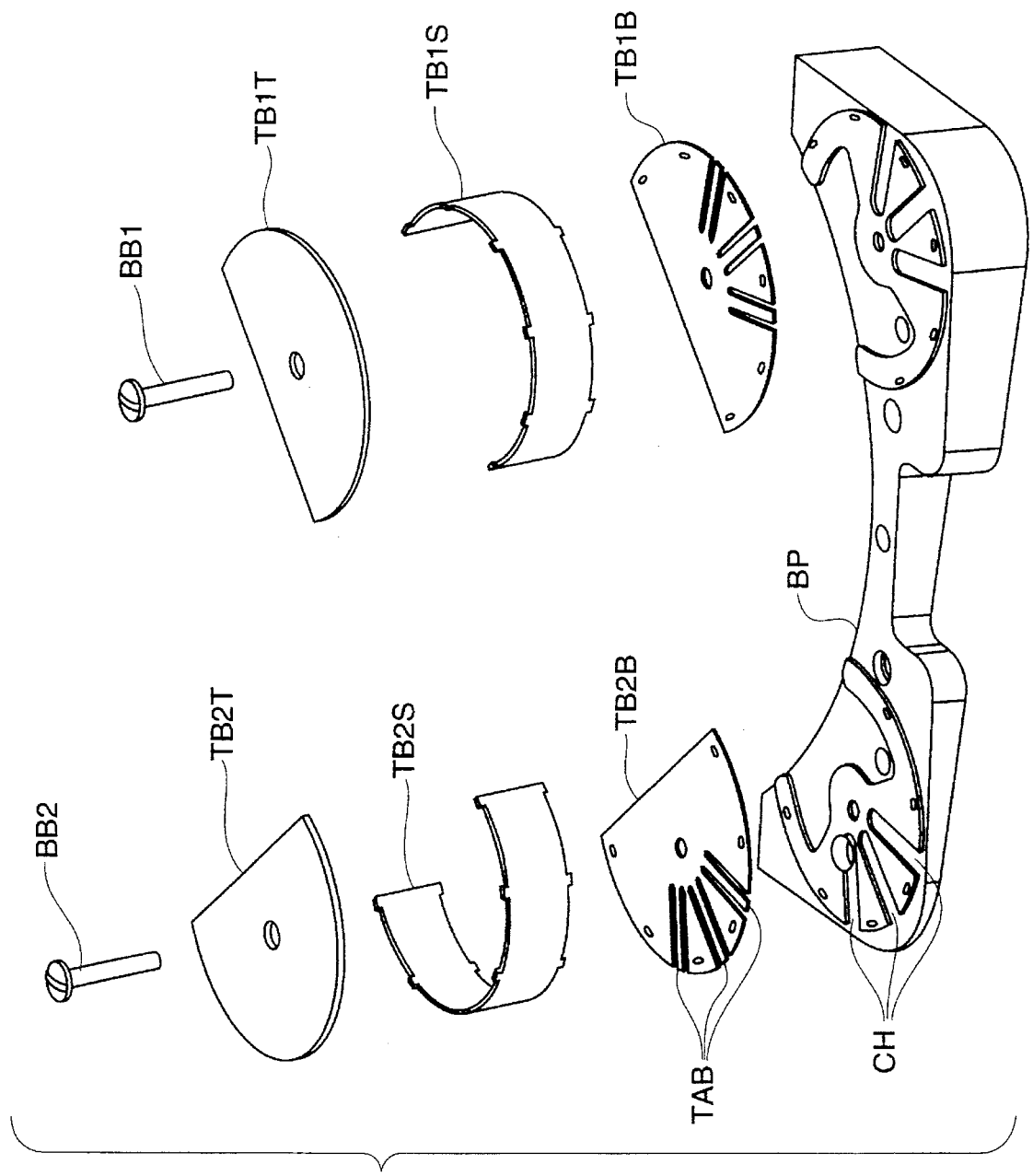
FIG. 4 illustrates an exploded perspective view of the hydrostatic bearing assembly of the tape cartridge of the present invention.

FIG. 4 illustrates an exploded perspective view of the hydrostatic bearing assembly TB while FIG. 5 illustrates a perspective view of the assembled hydrostatic bearing assembly TB. The hydrostatic bearing assembly TB comprises a base plate BP on which are mounted the two hydrostatic bearings TB1, TB2, at the respective distal ends of the base plate BP. In order to change the elevation of the magnetic tape MT within the tape cartridge TC of the present invention, the base plate BP is substantially wedge shaped to provide a coplanar surface on which the two hydrostatic bearings TB1, TB2 are mounted, yet also angularly orient this coplanar mounting surface with respect to the interior surface of the exterior housing H on which the base plate BP is itself mounted. While a wedge shape is illustrated herein, any arbitrary shape or even separable mounting bases for each hydrostatic bearing TB1, TB2 are possible alternatives. The base plate BP illustrated in FIG. 4 incorporates two channeled elements which, in conjunction with bottom guide plates TB1B, TB2B implement a plurality of compliant guide elements to guide the bottom edge of the magnetic tape MT as it travels over the hydrostatic bearings TB1, TB2. The compliant guide elements comprise tabs TAB which are formed in the bottom guide plates TB1B, TB2B and which can move in a vertical direction into the corresponding channel CH formed in the base plate BP. The base plate BP, bottom guide plate TB1B, TB2B and top guide plate TB1T, TB2T include slots which mate with the tabs formed on the bearing surface TB1S, TB2S to enable simple and precise alignment and assembly of the hydrostatic bearings TB1, TB2. The apparatus illustrated in exploded view in FIG. 4 are locked in position by the use of fasteners, such as bolts BB1, BB2 which screw into corresponding threaded holes in the base plate BP to draw down the top guide plate TB1T, TB2T on guide surface TB1S, TB2S, which is drawn down on to bottom guide plate TB1B, TB2B and base plate BP. The resultant assembled structure is illustrated in FIG. 5. The hydrostatic bearings TB1, TB2 are designed to have a large radius to fly the magnetic tape MT and thereby avoid the need for air bearings to support the magnetic tape MT and also reduce friction between the magnetic tape MT and the bearing surfaces.

Tape Path

Figure 9:
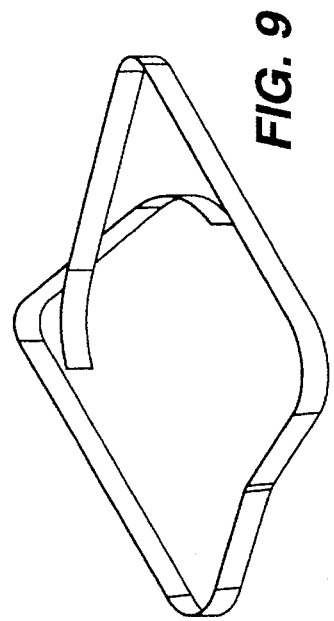
Figure 6:
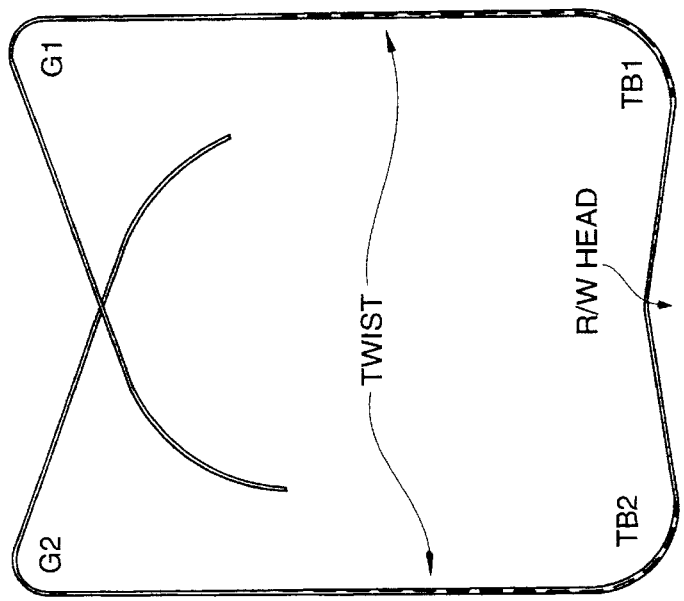

FIGS. 6–9 illustrate various views of the tape medium MT as it follows the tape path defined by the various elements which comprise the tape cartridge TC. In FIGS. 6 and 9, top down and perspective views are respectively provided of this tape path, absent all the tape cartridge apparatus, which shows the juncture of the magnetic tape MT and the tape reels R1, R2 as the ends of the solid line/tape profile, respectively. The magnetic tape MT proceeds from these two points to the respective tape guides G1, G2 (shown by alphanumeric designation only) around which the magnetic tape MT is redirected along a path parallel to the interior edge of the exterior housing H to the respective hydrostatic bearings TB1, TB2 (shown by alphanumeric designation only). The magnetic tape MT is redirected around each of the hydrostatic bearings TB1, TB2 across the front of the tape cartridge TC, where it contacts the tape read/write heads (not shown), which causes the deflection of the magnetic tape MT shown in FIGS. 6 and 9.

Figure 7:
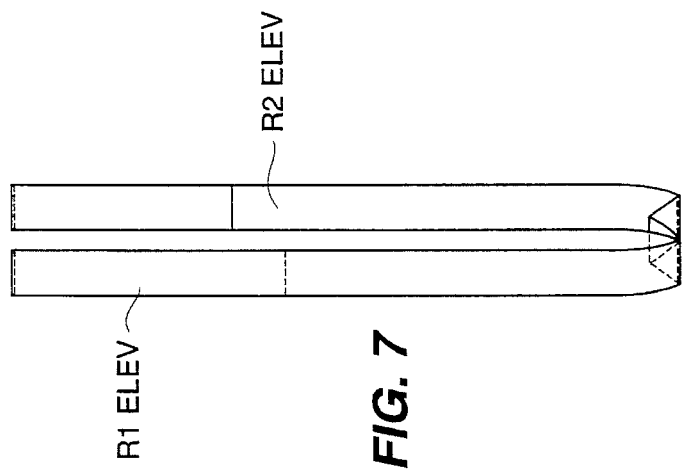
FIGS. 6–9 illustrate various views of the tape medium, configured in its operational tape path in the tape cartridge of the present invention.
Figure 8:
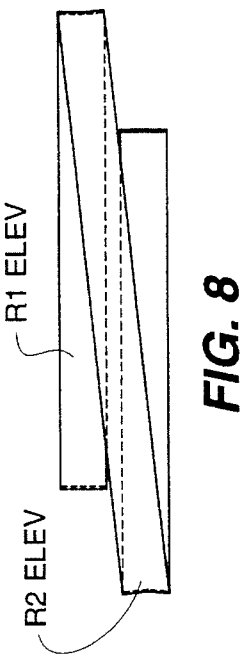

FIG. 7 illustrates a side view of the magnetic tape MT, to emphasize that the magnetic tape MT, as it traverses the path between a first tape guide G1 and its corresponding hydrostatic bearing TB1 is parallel to both the base B of the exterior housing H as well as the magnetic tape MT as it traverses the path between a second tape guide G2 and its corresponding hydrostatic bearing TB2. Thus, the magnetic tape MT is parallel to the interior surface of the exterior housing H at all points except where it traverses the front of the tape cartridge TC. FIG. 8 illustrates a front view of the magnetic tape MT to illustrate that the magnetic tape MT traverses a path, angularly oriented to the interior surface of the exterior housing H, as the magnetic tape MT travels from a first elevation corresponding to the plane of a first tape reel R1 to a second elevation corresponding to the plane of the second tape reel R2.

Additional features of the tape cartridge TC of the present invention include the use of optional coding apertures to define the contents of the tape cartridge TC, the ability to drive the tape reels R1, R2 by simply magnetically coupling the tape reels R1, R2 to the tape drive heads DH1, DH2, a lock mechanism which concurrently locks tape reel R1 to tape reel R2 as well as tape reel R1/R2 to housing H, which are described below.

Lock Mechanism

The tape cartridge TC includes two coaxially oriented, independently rotatable tape reels R1, R2. In order to prevent the two tape reels R1, R2 from rotating with respect to each other during shipping and handling, they must be positively locked together. In addition, to ensure that the magnetic tape MT does not move with respect to the exterior housing H, the tape reels R1, R2 must be positively locked to the exterior housing H. The significance of these lock requirements is that the tape cartridge TC can be managed to have a mid-point tape load. This entails positioning a predetermined mid-point of the magnetic tape MT opposite the access opening O of the exterior housing H so that the tape drive, when the tape cartridge TC is loaded therein, can access a predetermined reference point on the magnetic tape MT. The mid-point load is important for the ability to perform volume stacking on the magnetic tape. Volume stacking involves incorporating multiple tape volumes on a single tape medium, and the use of directory information recorded on the tape medium to enable precise and efficient location of these volumes. This increases the utilization of the tape medium and provides a much higher ratio of the tape medium recording space used to tape medium space available.

Figure 10:
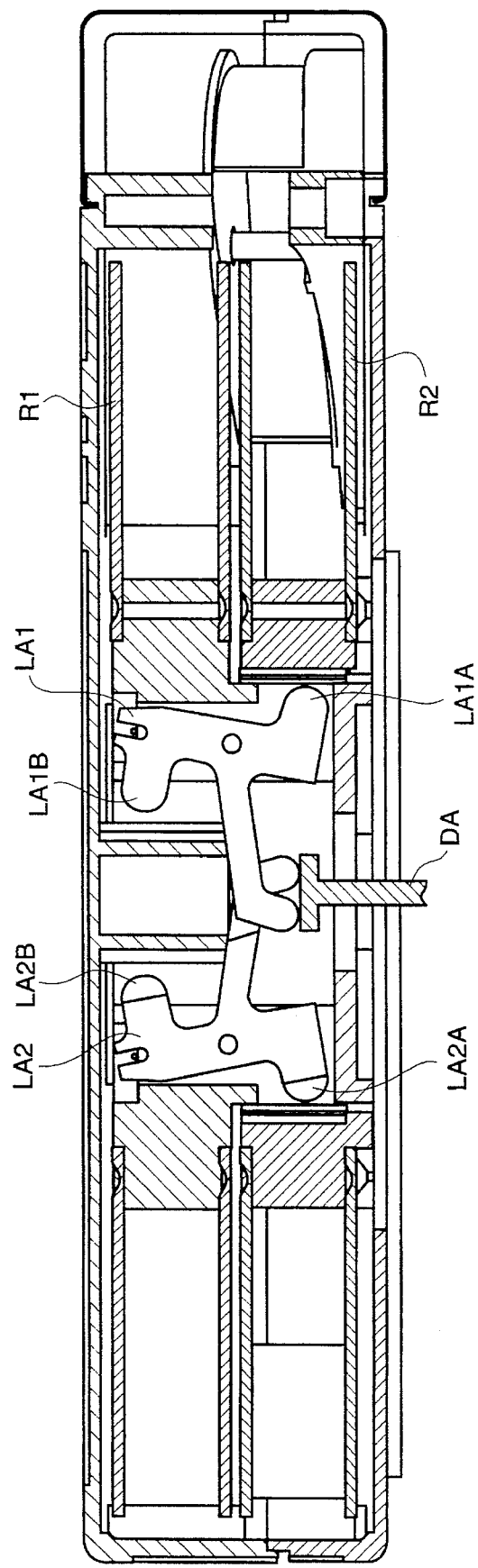
FIGS. 10 and 11 illustrate a cutaway side view of the tape cartridge, showing the lock mechanism in the unlocked and locked positions, respectively.
Figure 11:
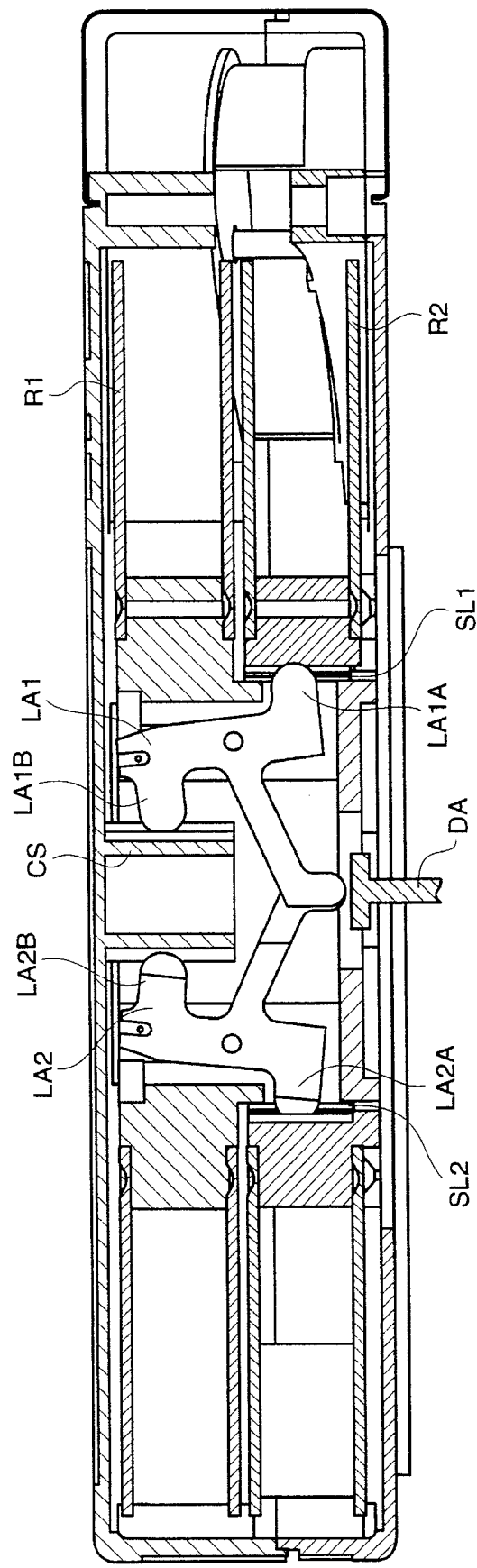
Figure 13:
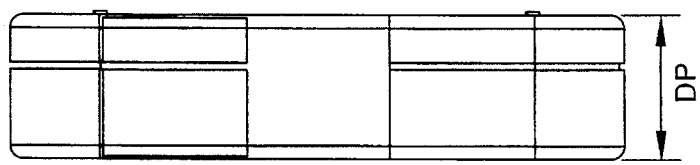
FIGS. 12–15 illustrate perspective, top down, end and side views of the assembled coaxial tape cartridge of the present invention, respectively.
Figure 15:
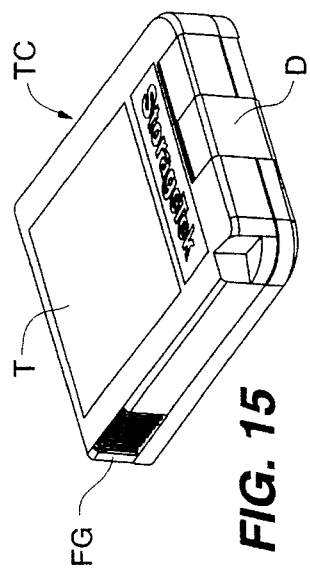
Figure 12:
Figure 14:
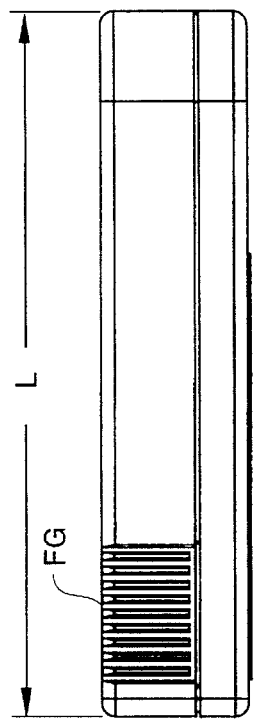

The lock mechanism is illustrated in FIGS. 10 and 11 which illustrate a cutaway side view of the tape cartridge TC, showing the lock mechanism in the unlocked and locked positions, respectively. In particular, the lock mechanism comprises a pair of spring loaded arms LA1, LA2 which function to concurrently engage splines CS, R2S on both the exterior housing of the tape cartridge TC and one of the tape reels R2, respectively. The two tape reels R1, R2 are coaxially mounted and a first tape reel R1 includes a shaft portion RS1 (also shown in FIG. 3) which fits into a corresponding opening RA in the second tape reel R2, the interior of this opening RA including a plurality of splines R2S circumferentially arranged in this opening RA. The shaft RS1 includes a pair of slots SL1, SL2 formed therein to enable a tab portion LA1A, LA2A of each of the lock arms LA1, LA2 to pass through the shaft RS1 to engage a spline R2S of the opening RA. FIG. 11 illustrates the locked position of the lock mechanism wherein the two lock arms LA1, LA2 are pivotally attached to the shaft RS1 of the first tape reel R1, held in the illustrated lock position by a corresponding spring S1, S2. The spring S1, S2 biases the lock arm LA1, LA2 so that the tab portion LA1A, LA2A of the lock arm LA1, LA2 protrudes through the slot SL1, SL2 formed in the shaft RS1 of the first tape reel R1 to engage a one of the splines R2S formed on the interior surface of the opening RA in the second tape reel R2. Likewise, another tab portion LA1B, LA2B of the lock arm LA1, LA2 is biased by the spring S1, S2 to engage a one of the splines CS of the projection formed in the cover C of the exterior housing H (also shown in FIG. 3). These two lock arms LA1, LA2 thereby simultaneously engage a spline RS2 on the second tape reel R2 and a spline CS on the projection formed on the interior of the cover C. Rotation of the two tape reels R1, R2 with respect to each other is prevented since the lock arm LA1, LA2 passes through a narrow slot SL1, SL2 formed in the shaft RS1 of the first tape reel R1 to engage the spline R2S on the second tape reel R2, while rotation of the tape reels R1, R2 with respect to the housing H is prevented by the engagement of the lock arm LA1, LA2 with the spline CS on the cover projection. The precision of positioning of the magnetic tape MT is a function of the spline width and frequency as well as the width of the slot. FIG. 10 illustrates the unlocked position of the lock mechanism wherein the two lock arms LA1, LA2 are pivotally attached to the shaft RS1 of the first tape reel R1, held in the illustrated unlocked position by the actuator DA, which is part of the tape drive hub mechanism, forcing up the locking arms LA1, LA2, thereby overcoming the normal bias of the corresponding spring S1, S2. The actuator DA rotates the lock arm LA1, LA2 so that the tab portion LA1A, LA2A of the lock arm LA1, LA2 does not protrude from the slot SL1, SL2 formed in the shaft RS1 of the first tape reel R1. Likewise, another tab portion LA1B, LA2B of the lock arm LA1, LA2 is rotated away from the splines CS of the projection formed in the cover C of the exterior housing H (also shown in FIG. 3) to thereby enable the two tape reels R1, R2 to rotate freely and independent of each other.

Tape Drive

Figure 16:
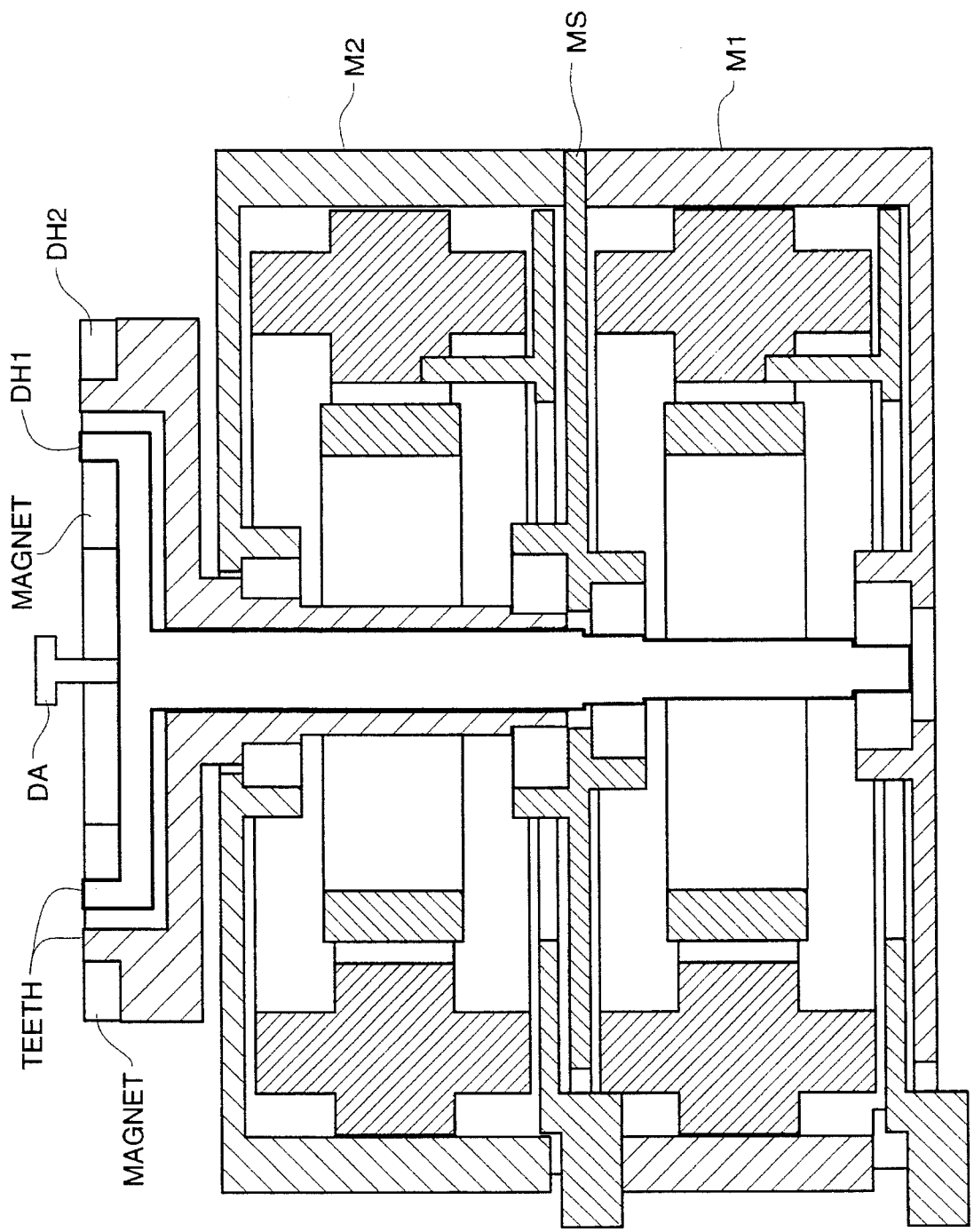
FIG. 16 illustrates a cutaway side view of the tape drive used to drive the coaxial tape cartridge of the present invention.

FIG. 16 illustrates a cross section view of a typical architecture of a cartridge drive for use with the tape cartridge TC of the preferred embodiment of the present invention. The cartridge drive includes a pair of coaxially mounted drive motors M1, M2, each of which drives a corresponding drive hub DH1, DH2 and which motors M1, M2 are separated by a motor spacer MS. The two drive hubs DH1, DH2 are coaxially mounted in the cartridge drive so that the shaft of a first drive hub DH1 fits into a corresponding opening formed in the second drive hub DH2. The shaft of the first drive hub DH1 rotates freely within the opening in the second drive hub DH2 and passes through the second drive hub DH2 to the first drive motor M1 which functions to drive the first drive hub DH1. The tape cartridge TC is typically loaded down on to the top of the tape drive drive hubs DH1, DH2. However, an alternative embodiment of the invention is the use of two drive motors, which are located one above the tape cartridge and one below the tape cartridge, to thereby drive one of the tape reels from a respective side of the tape cartridge. The tape drive can incorporate a clamshell type of tape cartridge receiving mechanism or can use a tape elevator type of mechanism to engage the drive hubs of the two drive motors with the tape reels.

The drive actuator DA which unlocks the locking mechanism of the tape cartridge TC is mounted on the first drive hub DH1 and engages the locking mechanism of the tape cartridge TC when the tape cartridge TC is mounted in the cartridge drive. The two tape reels R1, R2 can alternatively be attached to the drive motors via an internal post mechanism which engages the two tape reels and the respective drive motors.

Coding Apparatus

Figure 17:
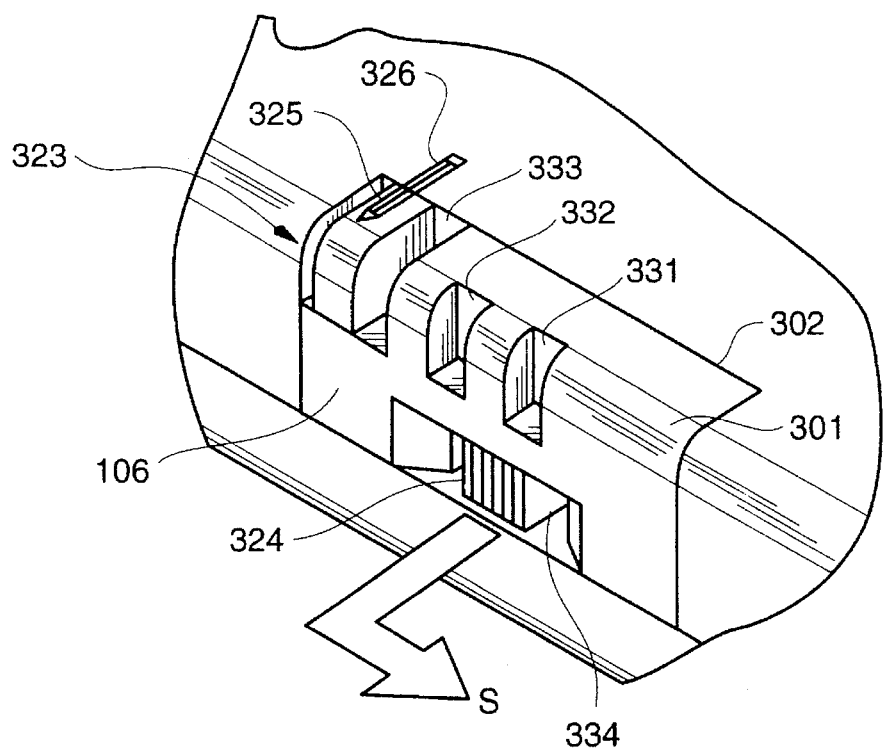
FIGS. 17 and 18 illustrate one embodiment of the coding apparatus optionally provided on the tape cartridge of the present invention.
Figure 18:
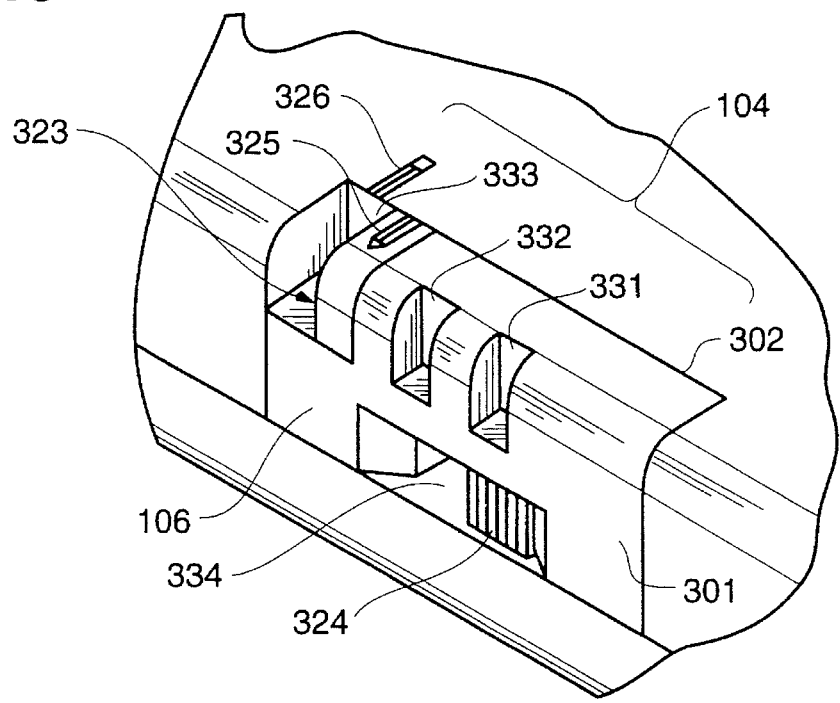

FIGS. 17 and 18 illustrate an embodiment of the coding holes 104 on the front surface of exterior housing H. In particular, the rectangular area 106 is implemented in the embodiment of FIGS. 17 and 18 as a recess 302 in the front surface of exterior housing H substantially juxtaposed to the access opening O. The recess 302 is substantially rectangular in shape, of predetermined dimensions and adapted to receive a block of material 301 that has exterior dimensions that substantially match the dimensions of the recess 302. The block 301 includes a plurality of apertures 104 therein arranged in a substantially linear array across the long dimension of the front surface of exterior housing H. The block 301 is designed to be snap fitted into the recess 302 in a manner that the exterior surfaces of the block 301 are substantially in alignment with the corresponding exterior surfaces of exterior housing H and to thus be locked in place. Block 301 is placed in recess 302 by using apertures 331 and 332. Included in the plurality of apertures 104 in the block, can be at least one aperture 333 that is used to denote the write protect status of the tape medium MT contained within the tape cartridge TC. As illustrated in attached Figures, the write protect aperture 333 is substantially larger than the other apertures contained in the block 301. The enlarged nature of this aperture 333 is such that it can accept a projection 323 that can be placed only in one of two positions as illustrated respectively in FIGS. 17 and 18. In the position illustrated in FIG. 17, the projection is aligned with the extreme edge of the block 301 and includes thereon a human readable mark 325 that aligns with a corresponding human readable mark 326 on a top surface of exterior housing H to indicate when the projection 323 is in this position that the tape medium MT contained within exterior housing H is not write protected. The second position of this projection 323 is illustrated in FIG. 18 wherein it is moved to the opposite end of the enlarged aperture 333 and the human readable marks 325, 326 on this projection 323 and exterior housing H no longer align to indicate to the user that the tape medium MT contained within exterior housing H can not be written and the tape cartridge TC is therefore write protected. The movement of this projection 323 is accomplished by the use of a slide mechanism (not shown) that consists of an elongated piece of material having two projections 323, 324 thereon. The first of these projections 323 represents the write enable defining projection that protrudes through the aperture 333 in the linear array of apertures 104 noted above. The second projection 324 is located a distance away from projection 323 on this member and protrudes through an opening 334 in the face of the block 301 to enable a user to activate the slide mechanism to move between the positions illustrated in FIGS. 17 and 18. The block 301 includes a recess (not shown) on the backside thereof to enclose at least part of the slide mechanism (not shown) and to sandwich the slide mechanism (not shown) between the block 301 and exterior housing H. Thus, the block 301 when inserted into the recess 302 creates a channel between the block 301 and the exterior housing H in which the slide mechanism (not shown) is moveable by the user relocating the second projection 324 of the slide mechanism (not shown) between the two positions illustrated in FIGS. 17 and 18. The block 301 can be color coded to illustrate in human readable form the primary contents of exterior housing H without the user having to decode the linear array of apertures 104 contained in the block 301.

Cartridge Labeling

Figure 19:
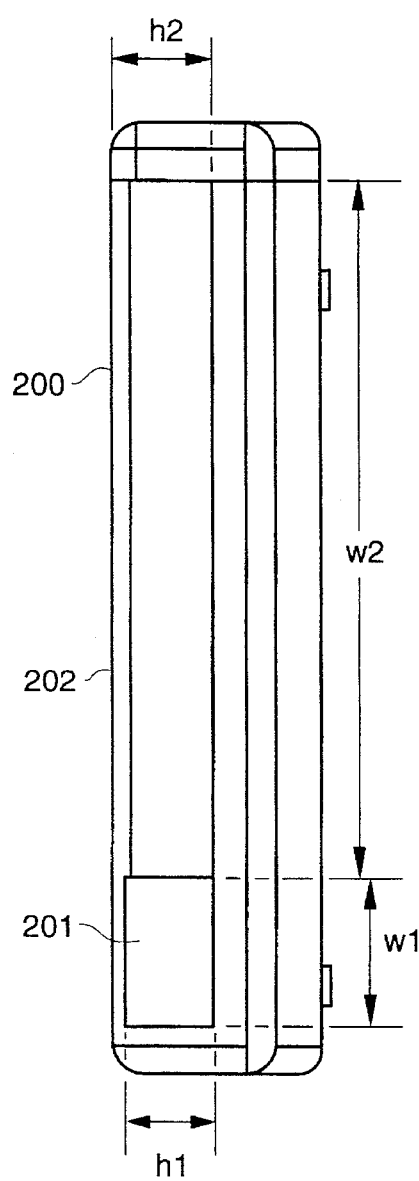
FIG. 19 illustrates an end view of the back of the tape cartridge of the present invention.

None of the mechanical differentiations described above assist a user or an automated tape cartridge library system in distinguishing between concentric reel tape cartridge TC and a 3480-type magnetic tape cartridge when the cartridge is stored in a cartridge storage location, since only the back of a tape cartridge can be seen when a tape cartridge is placed in a cartridge storage location in an automated tape cartridge library system or in a manual tape cartridge storage rack or in a cartridge drive. Therefore, an additional tape cartridge identification mechanism, located on the back side of the tape cartridge exterior housing H, is required to further differentiate between types of tape cartridges. FIG. 19 illustrates a top view of the back side of tape cartridge TC. Included in the back side 200 of tape cartridge TC exterior housing H is a first recess 201 and a second recess 202, each adapted to receive labels 500, 400 for tape cartridge identification purposes.

The first recess 201 is a substantially rectangular recess located at one end of the back side 200 of tape cartridge TC exterior housing H and adapted to receive a media identification label 500, preferably applied by the manufacturer of the tape cartridge TC, which media identification label 500 contains human readable 560, 570 and machine readable 540, indicia indicative of the media (magnetic tape) contained within tape cartridge TC. Juxtaposed to first recess 201 is substantially rectangular second recess 202 which extends from one end of first recess 201 to the other end of the long dimension of back side 200 tape cartridge TC. Second recess 202 is adapted to receive a cartridge identification label 400 applied thereto by the user of the tape cartridge TC to uniquely identify tape cartridge TC. As can be seen from FIG. 19, the height h1 of first recess 201 is slightly different than the height h2 of second recess 202 wherein height is defined as the dimension between top side T and bottom side B of tape cartridge TC exterior housing H. In addition, to further differentiate first recess 201 from second recess 202, first recess 201 is formed different depth into back side 200 of exterior housing H than second recess 202. First recess 201 is typically formed at least twice as deep/or shallow into the back side 200 of exterior housing H as is second recess 202. As can be seen from FIG. 19, the edge of both first recess 201 and second recess 202 closest to the bottom side B of tape cartridge TC are aligned to be substantially in line with each other.

The dimensions and placement of first recess 201 and second recess 202 are such that first recess 201 is easily mechanically differentiable from second recess 202 and of dimensions (h1*w1) sufficient to receive a media identification label 500 of extent great enough to contain human readable and machine readable indicia thereon which indicia define the magnetic tape MT contained within tape cartridge TC. Second recess 202 is of physical dimensions (h2*w2) such that it receives a cartridge identification label 400 containing human readable and machine readable indicia that uniquely identify tape cartridge TC. A typical label configuration for the cartridge identification label 400 inserted into second recess 202 consists of a cartridge identification label 400 containing two parallel columns 401, 402 of indicia wherein the columns 401, 402 extend along the long dimension (w2) of the cartridge identification label 400. One column 401 of the cartridge identification label 400 contains human readable indicia 42* while the adjacent column 402 contains machine readable indicia, which machine and human readable indicia are redundant for reliability purposes. This cartridge identification label 400 typically contains six characters of indicia.

Machine-Readable VOLSER Label

Figure 20:
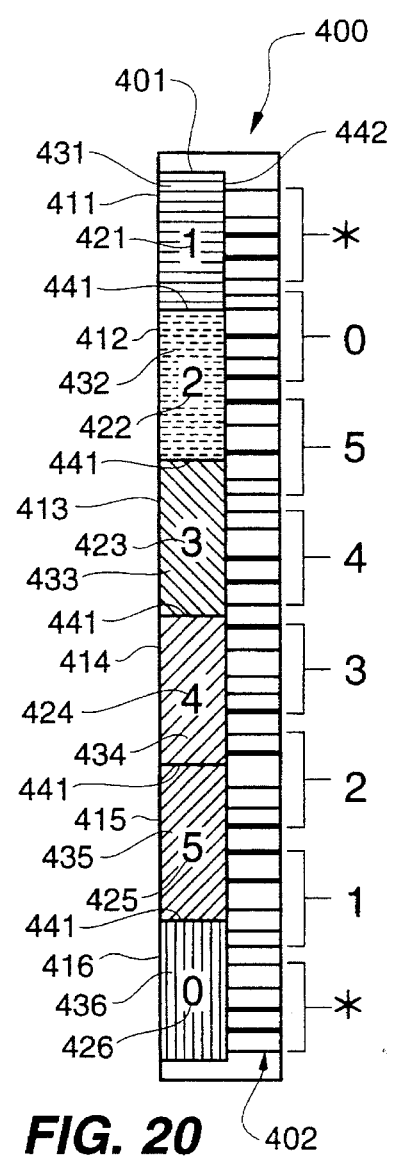
FIG. 20 illustrates a cartridge identification label for use on the tape cartridge of the present invention.

FIG. 20 illustrates a typical cartridge identification label 400 that can be used in second recess 202 on the back side 200 of exterior housing to uniquely tape cartridge TC. The cartridge identification label 400 incorporates a volume identification (VOLSER) imprinted thereon in both machine readable and human readable form. The first vertical column 401 of characters imprinted on the cartridge identification label 400 is divided into a series of vertically aligned, rectangular segments 411–416 each of which can be separated from a contiguous other by a printing trap comprising a solid line 441. The rectangular segments 411–416 can also be separated from a second vertically aligned column 402 of characters adjacent to and coextensive with the first vertical column 401 of characters by another printing trap 442 comprising a solid line. One character 421–426 of a machine-readable and human-readable code is located within each rectangular segment 411–416 in the first column 401 of characters thereby forming a message in a first code. The second vertical column 402 contains a single rectangular segment containing a string of characters in a machine-readable code such as a bar code. This string of characters in the second vertical column 402 comprises a message in a second code which is identical to the message formed in the first vertical column 401 in the machine-readable and human-readable code. In addition, the background 431–436 of each of the rectangular segments 411–416 contained within the first vertical column 401 are suitably color coded to correspond to the respective characters 421–426 of machine-readable and human-readable code contained therein, thereby providing a message in a third code which is identical to the above-described messages of the first and second codes.

The two vertical columns 401, 402 of characters imprinted with the first and second codes are so arranged for redundancy purposes. The message (1, 2, 3, 4, 5, 0) in the first vertical column 401 is printed to be read downwardly from top to bottom while the bar code (*, 1, 2, 3, 4, 5, 0, *) in the second vertical column 402 is printed to be machine readable upwardly in the reverse direction. In this manner, the cartridge identification label 400 may be used to accurately and uniquely identify a tape cartridge TC in spite of the absence of a portion of the cartridge identification label 400. For example, if the bottom segment of the cartridge identification label 400 were missing, a user or an automated cartridge library system would be able to read the first portion of the first code and the last portion of the second code. By combining these two readable segments of the first and second codes, the complete code on the cartridge identification label 400 can therefore be reconstructed.

Media Identification Label

Figure 21:
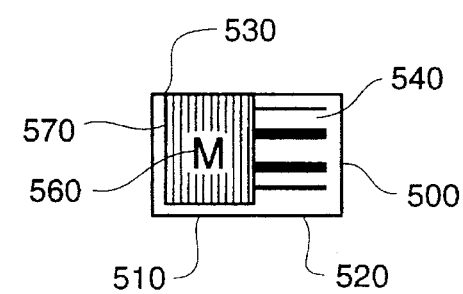
FIG. 21 illustrates a media identification label for use on the tape cartridge of the present invention.

FIG. 21 also illustrates a typical media identification label 500 that can be placed in first recess 201 on the back side 200 of exterior housing H of tape cartridge TC. The media identification label 500 incorporates indicia printed in both machine readable and human readable form to identify the media contained within tape cartridge TC. The first vertical column 510 of characters imprinted on media identification label 500 comprises at least one vertically aligned, rectangular segment 530 that can be separated from a second vertically aligned column 520 of characters adjacent to and coextensive with the first vertical column 510 of characters by a line of predetermined width. One character 560 of a human-readable code is located within each rectangular segment 530 in the first column 510 of characters thereby forming a message in a first code. The second vertical column 520 contains a single rectangular segment containing a string of characters in a machine-readable code, such as a bar code. This string of characters in the second vertical column 520 comprises a message in a second code which is identical to the message formed in the first vertical column 510 in the human-readable code. In addition, the background 570 of each of the rectangular segments 530 contained within the first vertical column 510 can be suitably color coded to correspond to the respective characters 560 of human-readable code contained therein, thereby providing a message in a third code which is identical to the above-described messages of the first and second codes.

The two vertical columns 510, 520 of characters imprinted with the first and second codes are so arranged for redundancy purposes. The message (M) in the first vertical column 510 is primed to be read downward (direction A) from the top (T) to bottom (B) of label 500 and the digits of the bar code in the second vertical column 520 are printed to be machine-readable downward in the same direction. The right hand column 520 of the media identification label 500 contains information inclusive of that printed in the left hand column 510 of the media identification label 500 as well additional information in the form of synchronization codes.

Furthermore, a third recess 112 is provided on the top T of tape cartridge TC to provide additional labeling areas that can be used by the user and/or the manufacturer to uniquely define tape cartridge TC and its contents. The third recess 112 is substantially square in dimensions and is adapted to receive a media identification label (not shown) installed thereon by a manufacturer to identify the manufacturer of tape cartridge TC and the type of magnetic tape MT contained therein.

While a specific embodiment of the invention has been disclosed herein, it is expected that variations of this specific implementation can be designed which fall within the intended scope of the appended claims.

We claim:

1. A tape cartridge capable of housing a magnetic tape, said tape cartridge being capable of being inserted into a tape drive for reading/writing data on said magnetic tape, and said tape cartridge further comprising:

a first reel rotating about a first axis in a first plane;

a second reel mounted coaxially with said first reel and rotatable about said first axis, said second reel rotating in a second plane which is parallel to said first plane;

a substantially rectangular exterior housing, having a top side, a bottom side and a front side for enclosing said first and second coaxially mounted reels;

a first drive spindle affixed coaxially to said first reel and said first drive spindle being accessible through an opening in said bottom side of said exterior housing for providing mechanical coupling of said first reel to a tape drive in which said tape cartridge is inserted;

a second drive spindle affixed coaxially to said second reel, said second drive spindle capable of being inserted in said second reel through a coaxial opening in said first reel, and said second drive spindle being accessible through said opening formed in said bottom side of said exterior housing for providing mechanical coupling of said second reel to said tape drive;

access means located in said front side of said exterior housing to provide said tape drive access to said magnetic tape of said tape cartridge;

a length of said magnetic tape having a first and a second end, said first end being attached to said first reel and said second end being attached to said second reel;

a first and a second tape bearing located on the front corners, one on either side of said access means for guiding said length of tape adjacent to said access means in an orientation to enable said tape drive to read/write data on said length of said magnetic tape;

a first tape segment extending from said first reel to said first tape bearing, the surface of said magnetic tape in first segment being perpendicular to said first plane along substantially the entirety of its extent;

a second tape segment extending from said second reel to said second tape bearing, the surface of said magnetic tape of said second segment being perpendicular to said second plane along substantially the entirety of said length of said magnetic tape;

said first and said second tape bearings being mounted on a base plate;

said base plate being wedge shaped and having a first surface affixed to an interior surface of said bottom of said exterior housing and a second surface oriented at an angle with respect to said first surface on which said first and second tape bearings are mounted; and said first and second bearings each comprising:

a bottom guide plate;

a top guide plate oriented parallel to said bottom guide plate; and a guide surface located between said top guide plate and said bottom guide plate for providing a path, constrained by said top guide plate and said bottom guide plate.

2. A tape cartridge containing a magnetic tape and having a substantially rectangular housing capable of being inserted into a tape drive for reading/writing data on said magnetic tape, and said cartridge further comprising:

a first reel tape rotatable in a first plane of rotation about an axis at a first elevation inside said housing;

a second tape reel rotatable about said axis in a second plane of rotation parallel with said first plane of rotation with said second reel being at a second elevation in said housing;

a first end of said magnetic tape attached to said first reel with the surface of said magnetic tape being substantially perpendicular to said first plane of rotation;

a second end of said magnetic tape attached to said second reel with the surface of said magnetic tape being substantially perpendicular to said second plane of rotation;

means for providing a mechanical coupling of said first and second tape reels to said tape drive for rotating said reels to transfer said tape between said first and second reels;

access means located in the front side of said housing for providing access to said magnetic tape for said tape drive to read/write on said tape;

a first tape guide means located substantially in a first rear corner inside of said housing and being at substantially said first elevation;

a second tape guide means located substantially in a second rear corner inside of said housing and being substantially at said second elevation;

a first tape bearing substantially at said first elevation and located substantially in a first front corner of said housing with said first tape bearing being oriented in a bearing plane of rotation angularly displaced from said first and second planes of rotation;

a second tape bearing substantially at said second elevation and located substantially in a second front corner of said housing with said second tape bearing oriented in said angularly displaced bearing plane of rotation;

a first tape path segment extending from said first reel to said first tape guide means with the surface of said magnetic tape of said first tape path segment being substantially perpendicular to said first plane of rotation;

said first tape guide means providing contact with said magnetic tape to bend said first tape path segment of said magnetic tape at an oblique angle to a second tape path segment;

said second tape path segment extending from said first tape guide means to said first tape bearing, the surface of said magnetic tape twisting during travel along said second tape path segment from the surface of said magnetic tape being substantially perpendicular to said first plane of rotation near said first guide means to the surface of said magnetic tape being substantially perpendicular to said bearing plane of rotation near said first tape bearing;

said first tape bearing providing contact with said magnetic tape to bend said magnetic tape of said second path segment at substantially a right angle to a third tape path segment;

said third tape path segment extending from said first tape bearing to said second tape bearing to change the elevation of said magnetic tape from said first elevation to said second elevation;

said second tape bearing providing contact with said magnetic tape to bend said magnetic tape of said third tape path segment at substantially a right angle to a fourth path segment;

said fourth tape path segment extending from said second tape bearing to said second tape guide means, said magnetic tape twisting during travel along said fourth tape path segment from the surface of said magnetic tape being substantially perpendicular to said bearing plane of rotation near said second tape bearing to the surface of said magnetic tape being substantially perpendicular to said second plane of rotation near said second tape guide means;

said second tape guide means providing contact with said magnetic tape to bend said magnetic tape of said fourth tape path segment at an oblique angle to a fifth tape path segment; and said fifth tape path segment extending from said second guide means to said second reel with the surface of said magnetic tape being substantially perpendicular to said second plane of rotation.

3. A tape cartridge of claim 2 wherein said first and second tape bearings are mounted on a base plate, said base plate being wedge shaped and comprising:

a first surface affixed to a bottom of said housing; and a second surface parallel to said bearing plane of rotation on which said first and second tape bearings are mounted.

4. A tape cartridge capable of housing a magnetic tape, said tape cartridge being capable of being inserted into a tape drive for reading/writing data on said magnetic tape, and said tape cartridge further comprising:

a first reel rotating about a first axis in a first plane;

a second reel mounted coaxially with said first reel and rotatable about said first axis, rotating in a second plane, parallel to said first plane;

a substantially rectangular exterior housing, having a top side, a bottom side and a front side for enclosing said first and second coaxially mounted reels;

means for providing a mechanical coupling of said first and second tape reels to said tape drive for rotating said reels to transfer said tape between said first and second reels;

access means located in said front side of said exterior housing to provide access to said magnetic tape to said tape drive;

a length of said magnetic tape having a first and a second end, said first end being attached to said first reel and said second end being attached to said second reel;

first and second tape bearings on front corners located one on either side of said access means for guiding said length of said magnetic tape adjacent to said access means in an orientation to enable said tape drive to read/write data on said length of tape;

first tape guide means coplanar with said first reel for receiving said magnetic tape as said magnetic tape unwinds from said first reel and for redirecting said magnetic tape to said first tape bearing;

a second tape guide means coplanar with said second reel for receiving said magnetic tape as said magnetic tape unwinds from said second reel and for redirecting said magnetic tape to said second tape bearing;

a first tape path segment extending from said first reel to said first guide means with said magnetic tape being substantially parallel to said first plane along the entirety of the extent of said first tape path segment;

a second tape path segment extending from said first guide means to said first tape bearing with said magnetic tape being substantially parallel to said first plane substantially along the entirety of said second tape path segment;

a third tape path segment extending from said second reel to said second guide means with said magnetic tape being substantially parallel to said second plane along the entirety of the extent of said third tape path segment; and a fourth tape path segment extending from said second guide means to said second tape bearing with said magnetic tape being substantially parallel to said second plane substantially along the entirety of said fourth tape path segment.

5. The tape cartridge of claim 4 wherein said access means comprises a substantially rectangular opening, located substantially in the middle of said front side of said exterior housing.

6. The tape cartridge of claim 4 wherein said first and second tape bearings are coplanar with respect to each other, said first and said second tape bearings being oriented in an angularly displaced plane from said first and second planes to transport said magnetic tape from a first elevation within said tape cartridge coplanar with said first reel to a second elevation within said tape cartridge coplanar with said second reel.

7. The tape cartridge of claim 6 wherein said second and said fourth tape path segments twist said magnetic tape over an angle corresponding to said angularly displaced plane.

8. The tape cartridge of claim 4 wherein each of said first and second tape bearings comprise:

a bottom guide plate;

a top guide plate oriented parallel to said bottom guide plate; and a guide surface located between said top guide plate and said bottom guide plate for providing a path, constrained by said top guide plate and said bottom guide plate, for said magnetic tape.

9. The tape cartridge of claim 8 wherein said first and second tape bearings are mounted on a base plate, said base plate being wedge shaped, having a first surface capable of being affixed to an interior surface of said bottom of said exterior housing and a second surface of oriented at an angle with respect to said first surface on which said first and said second tape bearings are mounted.

10. The tape cartridge of claim 4 wherein said exterior housing substantially has the exterior dimensions of a 3480-type magnetic tape cartridge.

11. The tape cartridge of claim 4 wherein said magnetic tape comprises a magnetic tape having a recording surface facing outward when said magnetic tape is wound on said first and said second reels.

12. The tape cartridge of claim 4 further comprising means mechanically imprinted into one exterior surface of said exterior housing for defining said magnetic tape, including a plurality of coding apertures located on said one exterior surface of said exterior housing.

13. The tape cartridge of claim 4 further comprising:

a recess of predefined dimensions in one exterior surface of said exterior housing; and means for providing a plurality of coding apertures capable of being inserted into said recess.

14. The tape cartridge of claim 13 wherein each of said plurality of coding apertures is capable of being set in binary form as opened/closed to identify one of a set of predefined data storage characteristics assigned to said magnetic tape.

15. The tape cartridge of claim 13 wherein said coding apertures comprises means for defining at least one of said coding apertures located between said providing means and said exterior housing, and said means for defining at least one of said coding apertures capable of sliding with respect to said providing means, and said means for defining at least one of said coding apertures comprises:

a first projection for blocking said at least one aperture when said defining means is in a first position; and a second projection, accessible through an access slot in said providing means for enabling said defining means to slide into said first position to thereby manually define at least one of said coding apertures.

16. The tape cartridge of claim 15 wherein said providing means comprises a block of exterior dimensions substantially the same as said predefined dimensions of said recess and including a recess on one side of said block to enclose at least a part of said second projection between said providing means and said exterior housing.

17. The tape cartridge of claim 13 wherein said providing means comprises color coding, substantially surrounding said plurality of coding apertures.

18. The tape cartridge of claim 13 wherein said plurality of coding apertures are aligned in a linear array on one surface of said providing means.

19. The tape cartridge of claim 13 wherein said providing means of said plurality of coding apertures comprises indicator means alignable with a corresponding indication on said exterior housing to denote in human readable form the state of at least one aperture.

20. The tape cartridge of claim 4 further comprising:

first recess means of predetermined dimensions located on a back side of said exterior housing for receiving a label identifying data storage characteristics of said tape cartridge; and second recess means of predetermined dimensions located on said back side of said exterior housing juxtaposed to said first recess means and said second recess means being capable of receiving a label for identifying said cartridge.

21. The tape cartridge of claim 20 further comprising third recess means of predetermined dimensions located on said top side of said exterior housing for receiving a label identifying said tape cartridge.

22. A method for transporting a magnetic tape inside a tape cartridge from a first reel mounted on an axis at a first elevation to a second reel mounted on said axis coaxially with said first reel at a second elevation, said method comprising the steps of:

unwinding said magnetic tape from said first reel to a first tape guide means located substantially at said first elevation located inside a first corner substantially in a back side of said cartridge;

bending said magnetic tape with said first tape guide means towards a first tape bearing located substantially at said first elevation, inside a first corner of a front side of said cartridge on the same side of said cartridge as said first guide means and said first tape bearing being oriented parallel to a bearing plane of rotation angularly displaced from a bottom side of said cartridge;

twisting the surface of said magnetic tape from being substantially perpendicular to said bottom side of said cartridge, to the surface of said magnetic tape being substantially perpendicular to said bearing plane of rotation;

bending said magnetic tape substantially 90° with said first tape bearing towards a second tape bearing located substantially at said second elevation substantially in a second corner of said front side of said cartridge, and said second tape bearing being oriented parallel with said bearing plane of rotation;

changing the elevation of said magnetic tape from said first elevation to said second elevation by transferring said magnetic tape from said first tape bearing to said second tape bearing;

bending said magnetic tape substantially 90° with said second tape bearing towards a second tape guide means substantially in a second corner inside said back side of said cartridge at substantially said second elevation;

twisting the surface of said magnetic tape from the surface of said magnetic tapes being substantially perpendicular to said bearing plane of rotation to the surface of said magnetic tape being perpendicular to said bottom of said cartridge as said tape transfers from said second tape bearing to said second tape guide means;

bending said magnetic tape by said second tape guide means towards said second reel;

winding said magnetic tape onto said second reel; and passing said magnetic tape by an access means in said front of said housing as said magnetic tape travels from said first tape reel to said second tape reel.

* * * * *